United States Patent
Jelonnek

(10) Patent No.: US 7,327,804 B2
(45) Date of Patent: Feb. 5, 2008

(54) METHOD FOR LIMITING AMPLITUDE OF A CARRIER FREQUENCY OUTPUT SIGNAL

(75) Inventor: Björn Jelonnek, Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 407 days.

(21) Appl. No.: 10/512,842

(22) PCT Filed: Apr. 1, 2003

(86) PCT No.: PCT/EP03/03398

§ 371 (c)(1),
(2), (4) Date: Oct. 29, 2004

(87) PCT Pub. No.: WO03/094462

PCT Pub. Date: Nov. 13, 2003

(65) Prior Publication Data

US 2005/0163269 A1    Jul. 28, 2005

(30) Foreign Application Priority Data

Apr. 30, 2002  (DE) ................... 102 19 318
Apr. 30, 2002  (EP) ................... 02009775

(51) Int. Cl.
*H04L 27/00* (2006.01)
(52) U.S. Cl. .................... 375/295; 375/296
(58) Field of Classification Search ............ 375/295, 375/259, 260, 296, 347
See application file for complete search history.

(56) References Cited

U.S. PATENT DOCUMENTS

| | | | | |
|---|---|---|---|---|
| 4,384,358 A | * | 5/1983 | Shiki et al. | 375/347 |
| 5,260,968 A | * | 11/1993 | Gardner et al. | 375/347 |
| 5,349,609 A | * | 9/1994 | Tsujimoto | 375/347 |
| 5,727,026 A | * | 3/1998 | Beukema | 375/296 |
| 5,901,346 A | * | 5/1999 | Stengel et al. | 455/126 |
| 6,038,261 A | * | 3/2000 | Mestdagh | 375/285 |

(Continued)

FOREIGN PATENT DOCUMENTS

DE  198 24 233  12/1999

(Continued)

OTHER PUBLICATIONS

Jouko Vankka et al., "A Multicarrier QAM Modulator", IEEE Transctions on Circuits and Systems—II: Analog and Digital Signal Processing, vol. 47, No. 1, Jan. 2000, pp. 1-10.

(Continued)

*Primary Examiner*—David C. Payne
*Assistant Examiner*—Leon-Viet Q Nguyen
(74) *Attorney, Agent, or Firm*—Staas & Halsey LLP

(57) ABSTRACT

Partial signals of a basic frequency band are used to form a carrier frequency output signal. Each of n partial signals is attributed as an input signal to a representative main branch and the corresponding partial signal is limited in amplitude, filtered and converted into an intermediate frequency partial signal. As output signals of the main branch, the n partial signals are assembled into a common sum signal. Moreover, each partial signal reaches an auxiliary branch, whereby expected peak values of the partial signal can be determined as estimated values. Using the estimated values, the amplitude limitations of the corresponding partial signals, executed in the main branch, can be regulated in the branch.

6 Claims, 8 Drawing Sheets

U.S. PATENT DOCUMENTS

| | | | |
|---|---|---|---|
| 6,317,062 B1* | 11/2001 | Payer et al. ................... | 341/56 |
| 6,337,999 B1 | 1/2002 | Orban | |
| 6,477,477 B1* | 11/2002 | Thron et al. ................... | 702/86 |
| 6,504,862 B1* | 1/2003 | Yang .......................... | 375/146 |
| 6,687,511 B2* | 2/2004 | McGowan et al. ......... | 455/522 |
| 6,751,267 B1* | 6/2004 | Schill et al. ................ | 375/296 |
| 6,996,378 B2* | 2/2006 | Helms ........................ | 455/91 |
| 2003/0012292 A1* | 1/2003 | Hunton ....................... | 375/295 |

FOREIGN PATENT DOCUMENTS

| | | |
|---|---|---|
| EP | 1 058 400 | 12/2000 |
| WO | 01/99293 | 12/2001 |

OTHER PUBLICATIONS

Frederick H. Raab et al., "Power Amplifiers and Transmitters for RF and Microwave", IEEE Transactions on Microwave Theory and Techniques, vol. 50, No. 3, Mar. 2002, pp. 814-826.

\* cited by examiner

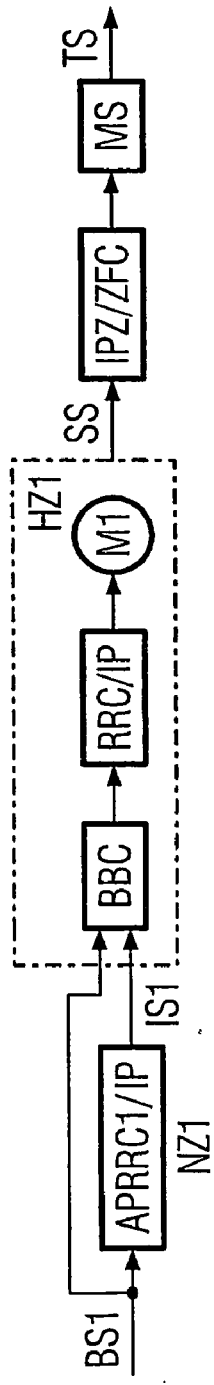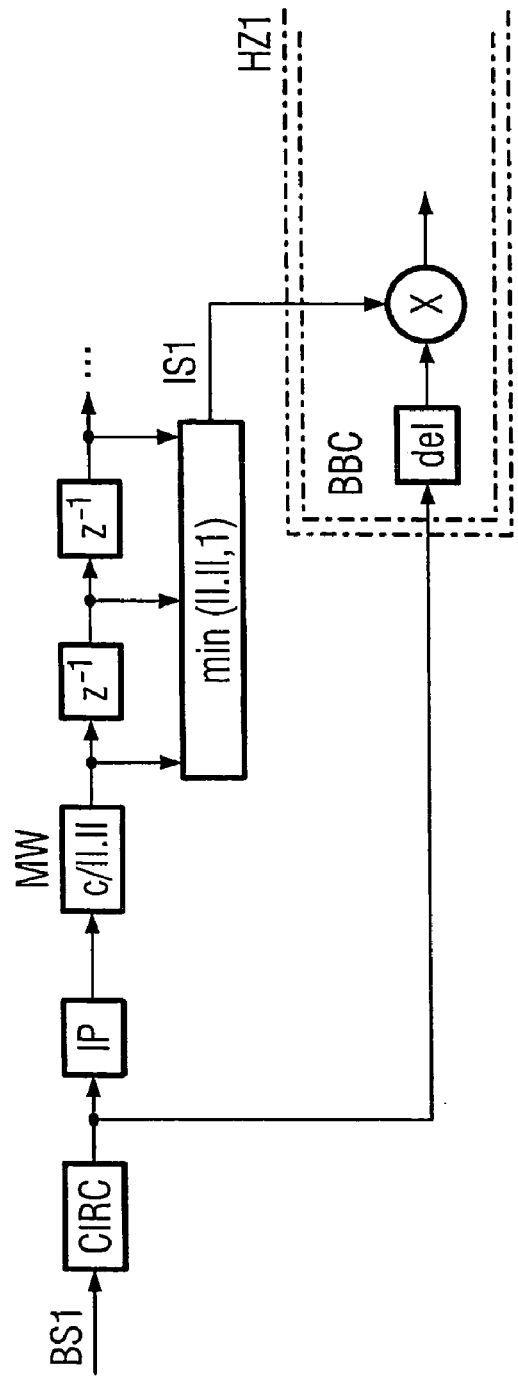

METHOD FOR LIMITING AMPLITUDE OF A CARRIER FREQUENCY OUTPUT SIGNAL

CROSS REFERENCE TO RELATED APPLICATIONS

This application is based on and hereby claims priority to German Patent Application No. 102 19 318.5 and Europe Patent Application No. 02009775.4, both filed on 30 Apr. 2002, the contents of which are hereby incorporated by reference.

BACKGROUND OF THE INVENTION

1. Field of the Invention

The invention relates to a method for forming a carrier frequency output signal from n partial signals of a basic frequency band, wherein each of the n partial signals is attributed as an input signal to a corresponding main branch. In each corresponding main branch the partial signal is limited in amplitude, filtered and converted into an intermediate frequency partial signal, and as output signals of the main branches, the n intermediate frequency partial signals are assembled into a common sum signal. The common sum signal is limited in amplitude, subjected to a digital-analog conversion and converted into the carrier frequency output signal.

2. Description of the Related Art

In the case of radio communication systems developed according to the EDGE standard or the UMTS standard, in what is known as the single-carrier approach, complex baseband partial signals such as those for generating carrier frequency partial signals are linearly modulated and superimposed. At the same time the carrier frequency partial signals do not exhibit any fixed instantaneous power.

Due to the linear modulation, the peak values for amplitude or power which occur in each carrier frequency partial signal are significantly higher than the average power value of the carrier frequency partial signal. This yields what is known as a peak-to-average value PAR>1.

The carrier frequency partial signal is fed to a RF output amplifier with a characteristic which must have sufficient in reserve for linear amplification to avoid non-linear distortions in the amplifier output signal.

Due to the reserve requirement, such an amplifier is very complex in design and has raised power consumption. Furthermore there are consequent reductions in the overall efficiency of the transmission system.

In what is known as the multi-carrier approach, a plurality of baseband partial signals modulated using differentiated carrier frequencies is converted to an intermediate frequency range. In the range the intermediate frequency partial signals are coherently assembled into a sum signal. The sum signal is converted into a carrier frequency output signal and reaches the RF output amplifier. Here too, the peak values for amplitude or power which occur in the carrier frequency output signal are significantly higher than the average power value of the carrier frequency output signal. In this case too, the RF output amplifier must have sufficient in reserve.

In both the single-carrier and the multi-carrier approach, procedures known as clipping methods are used on the partial signals for limiting amplitude in the baseband in the former case and in the intermediate frequency range in the latter case.

During the clipping method used in the baseband, the partial signal becomes highly distorted in its frequency band. Using root raised cosine filters (also known as RRC filters), the spectrum of the distortion caused by clipping and of the partial signal itself is limited in order to reduce interference in adjacent frequency bands.

Moreover, the RRC filters form linear combinations out of past and present status values of the partial signal, since the RRC filters are used to interpolate the partial signal. This again causes a significant increase in the peak amplitude value of the partial signal that has been limited in amplitude by the clipping method.

In the case of clipping methods in the intermediate frequency range, the peak amplitude values are not raised, but serious interference is generated in adjacent frequency bands.

Two clipping methods can be used as alternatives in both the basic frequency band and the intermediate frequency band. Rectangular clipping is easily installed and limits the amplitude of in-phase and quadrature components of the partial signal independently of one another. In circular clipping an amount derived from the complex partial signal does not exceed a predefined maximum value.

SUMMARY OF THE INVENTION

An object of the invention is to limit the amplitude values of complex digital partial signals in such a way that the partial signals can be fed to an amplifier with lower amplification reserves.

According to an aspect the invention, increased amplitude heights in the baseband partial signal are avoided and interference to the carrier frequency transmitter signal is reduced, by determining the expected peak values of the baseband partial signal and by building up control information for influencing the baseband clipping.

The method to which the invention relates obtains a reduction in the value of the peak-to-average ratio PAR in the partial signal for an equivalent value of the error vector magnitude EVM.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 10 is a further simplified block diagram for forming a carrier frequency UMTS transmitter signal from a single partial signal according to the invention, FIG. 12 is a simplified block diagram for a second typical embodiment for forming the information signal as displayed in FIG. 10.

FIG. 1 shows a simplified block diagram for forming a carrier frequency UMTS transmitter signal TS from a plurality of partial signals BS1, BS2, BS3 and BS4 according to the related art.

Figure 1:
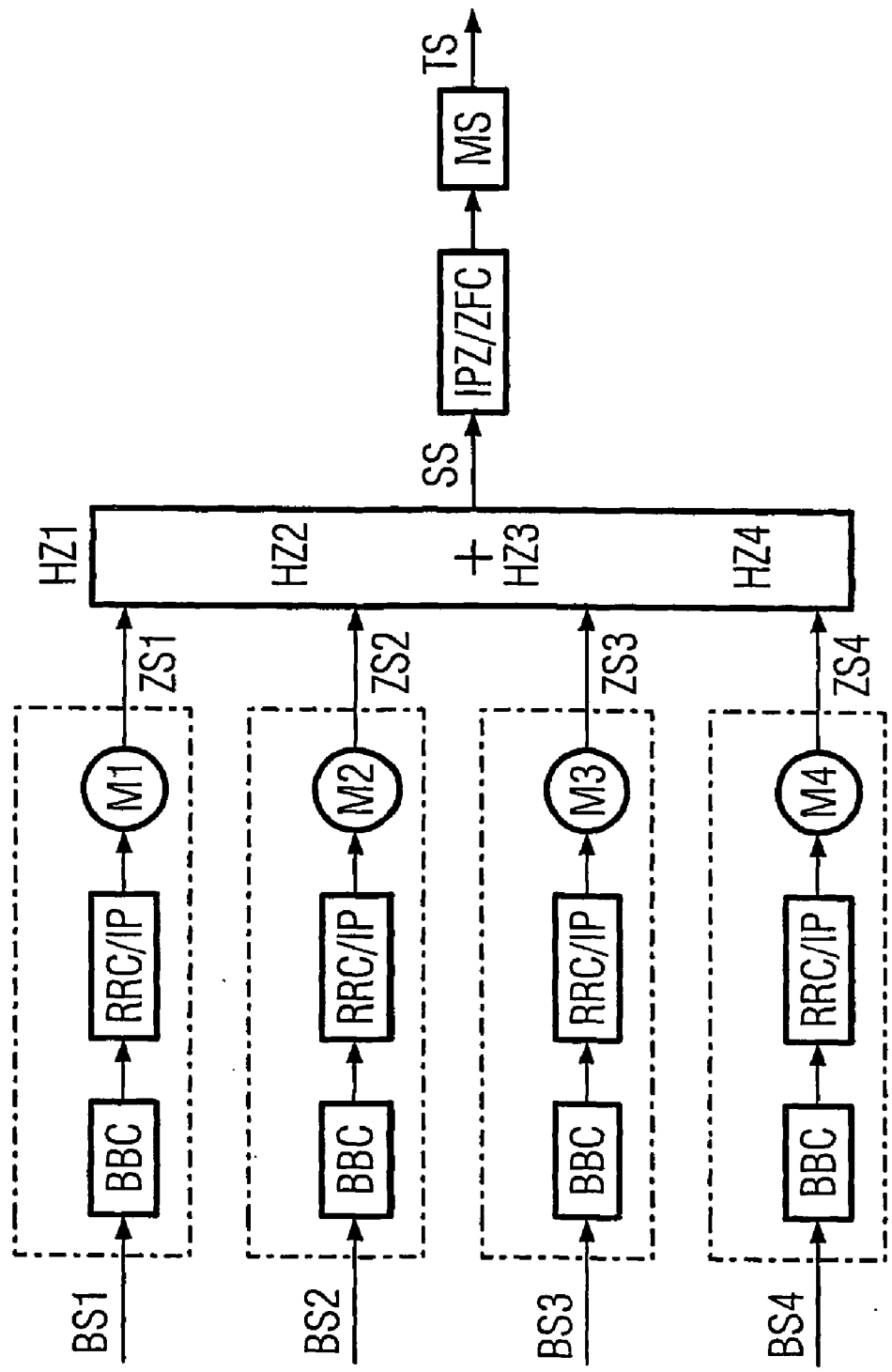
FIG. 1 is a simplified block diagram for forming a carrier frequency UMTS transmitter signal from a plurality of partial signals according to the related art.

In a multi-carrier arrangement shown here, partial signals BS1 to BS4 are converted into different intermediate frequency partial signals ZS1, ZS2, ZS3 and ZS4 respectively and assembled into a common sum signal SS. This common sum signal SS is converted into the carrier frequency UMTS transmitter signal TS.

The partial signals BS1, BS2, BS3 and BS4 of a basic frequency band are attributed to a main branch HZ1, HZ2, HZ3 and HZ4 respectively.

A first partial signal BS1 reaches a first main branch HZ1, where it has its amplitude limited by a module BBC which is arranged there, is filtered by a root raised cosine filter RRC, is interpolated with the aid of an interpolation stage IP and converted into a first intermediate frequency partial signal ZS1 with the aid of a first mixer M1.

In a comparable way the partial signals BS2 to BS4 are converted into further intermediate frequency partial signals ZS2 to ZS4 with the aid of main branches HZ2 to HZ4, the intermediate frequency partial signals ZS1 to ZS4 having different carrier frequencies.

The intermediate frequency partial signals ZS1 to ZS4 reach a summation device where they are assembled into a common sum signal SS. The sum signal SS is interpolated with the aid of a module IPZ, then with the aid of a device ZFC has its amplitude limited and is converted into an analog signal, after which with the aid of a modulator MS it is converted into the carrier frequency UMTS transmitter signal TS.

The previously described disadvantages of amplitude limiting in the baseband (baseband clipping, BBC) as well as in the intermediate frequency range (ZFC) accordingly apply.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 2:
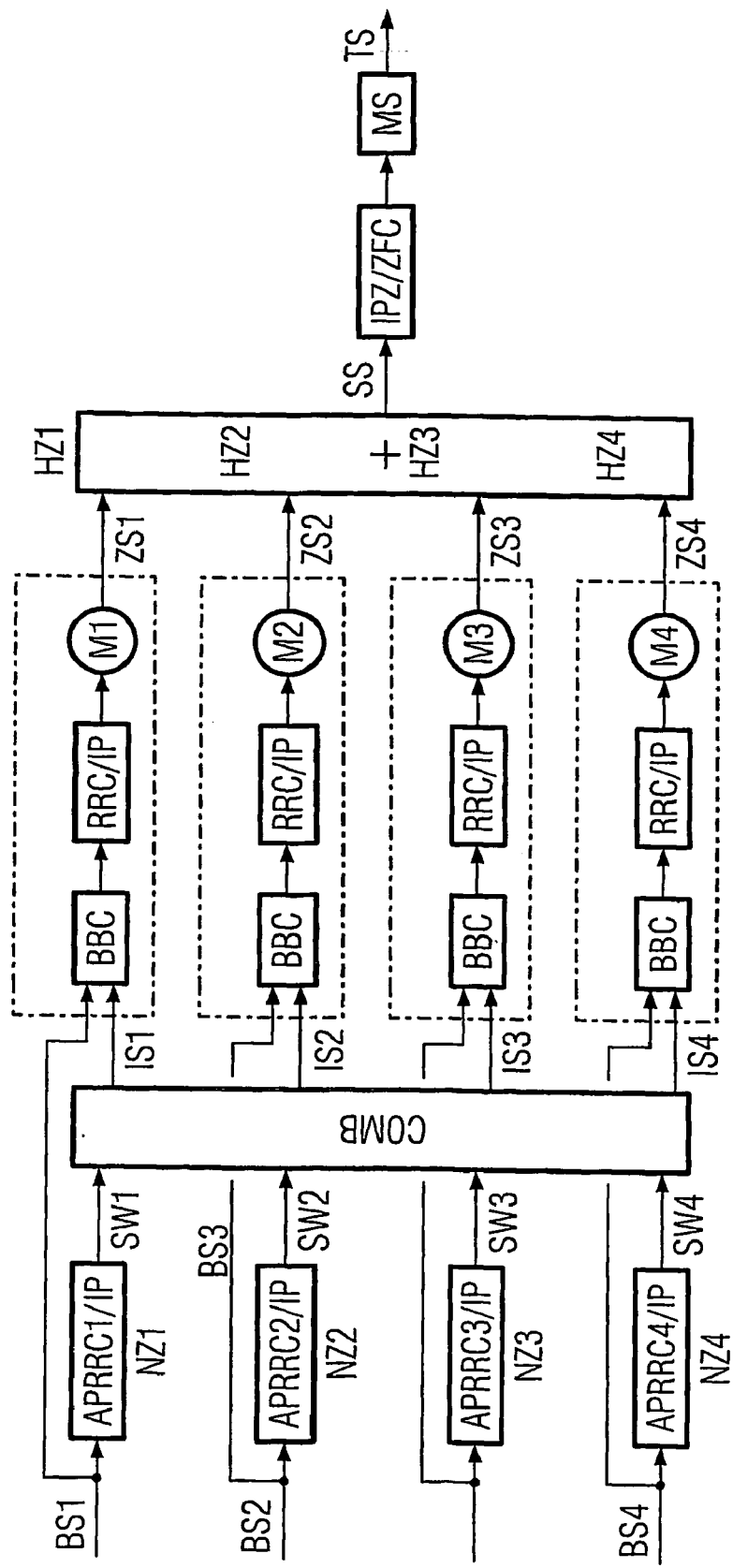
FIG. 2 is a simplified block diagram for forming a carrier frequency UMTS transmitter signal from a plurality of partial signals according to the invention.

FIG. 2 shows a simplified block diagram for forming a carrier frequency UMTS transmitter signal TS from a plurality of partial signals BS1, BS2, BS3 and BS4 according to the invention.

In a comparable way to FIG. 1, each of the partial signals BS1 to BS4, as input signals, reaches a main branch HZ1, HZ2, HZ3 and HZ4 respectively, and an auxiliary branch NZ1, NZ2, NZ3 and NZ4 respectively.

Thus for example the first main branch HZ1 and a first auxiliary branch NZ1 can be attributed to the first partial signal BS1. Using the first auxiliary branch NZ1, the expected peak values of the intermediate frequency partial signal ZS1 in the attributed main branch HZ1 due to amplitude limiting are determined as an estimated value SW1 which reaches a common combiner COMB as an output signal of the auxiliary branch NZ1.

The expected peak values in the main branch HZ1 is determined in the auxiliary branch NZ1 with the aid of a module APRRC1. As a further advantage an interpolation (IP) also takes place.

In a comparable way, estimated values SW2, SW3 and SW4 for the expected peak values in the main branches HZ2, HZ3 and HZ4 are determined for the partial signals BS2 to BS4 respectively, and these estimated values SW2 to SW4 likewise reach the common combiner COMB.

For each of the partial signals BS1 to BS4 the common combiner COMB builds up a special information signal IS1, IS2, IS3 or IS4 respectively, and this is used to regulate the amplitude limiting in the respective main branches HZ1 to HZ4.

Figure 3:
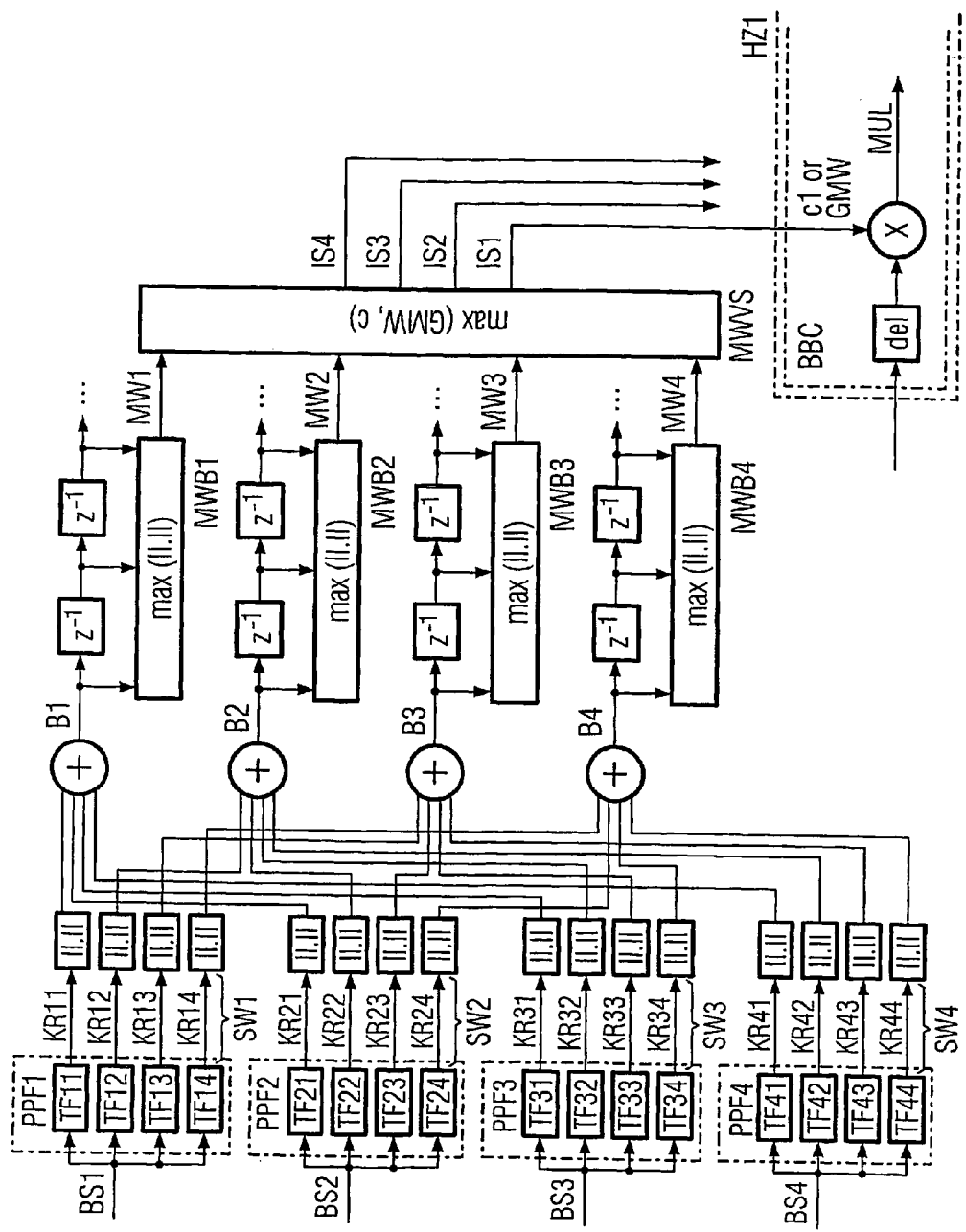
FIG. 3 is a simplified block diagram of a typical embodiment for forming the information signals displayed in FIG. 2.

FIG. 3 shows a typical embodiment for forming the information signals IS1, IS2, IS3 and IS4 displayed in FIG. 2.

As an input signal, each of the four partial signals BS1 to BS4 of the basic frequency band reaches a polyphase filter PPF1, PPF2, PPF3 or PPF4. A first polyphase filter PPF1 contains four partial filters TF11, TF12, TF13 and TF14 arranged in parallel. A second polyphase filter PPF2 contains four partial filters TF21, TF22, TF23 and TF24 arranged in parallel. A corresponding arrangement applies to the polyphase filters PPF3 and PPF4.

The first partial signal BS1 reaches the first polyphase filter PPF1, or its four partial filters TF11 to TF14, for example. From the first input signal BS1, a first partial filter TF11 forms a first signal sequence KR11 with an amplitude/frequency response corresponding to the RRC filter of the main branch HZ1, and samples which are offset from the first partial signal BS1 by a fixed time difference relative to the sampling points.

Signal sequences KR12, KR13 or KR14 are formed accordingly with the aid of the partial filters TF12, TF13 or TF14 of the first polyphase filter PPF1, the signal sequences KR11 to KR14 of the first polyphase filter PPF1 representing the estimated value SW1 displayed in FIG. 2.

The same applies to the partial signals BS2 to BS3, which reach corresponding polyphase filters PPF2 to PPF4, signal sequences KR21, KR22 up to KR44 being formed for the partial signals BS2 to BS4.

Where n=1,2,3,4 the first signal sequences KRn1 of the polyphase filters PPF1 to PPF4 respectively are assembled by amount into a first amount sum B1. An estimate of the maximum possible values for the interpolated, modulated sum signal SS is thus made in respect of the above-mentioned sampling points.

The same happens for other time differences with the second, third or fourth signal sequences KRn2, KRn3 or KRn4, which are assembled by amount into the amount sum B2, B3 or B4 respectively. Due to the time differences in each of the partial filters TFn1 to TFn4, a signal value occurring at a certain fixed point in time—for example in BS1—affects a plurality of values in the sum signal SS. The maximum value of the plurality of values so affected is determined with the aid of the arrangement described below.

For the purpose of determining the maximum value, the first amount sum B1, considered here as representing all the amount sums from B1 to B4, is forwarded on the one hand directly and on the other hand with delay produced by a plurality of delay elements $z^{-1}$, to a first maximum value forming device MWB1, which is then used to construct a first maximum value MW1. This maximum value contains information about a maximum amplitude occurring in the sum signal SS at a particular time delay.

Further maximum values MW2, MW3 or MW4 are built up in a corresponding manner from the amount sums B2, B3 or B4. The maximum values MW1 to MW4 are fed to a common maximum value comparison stage MWVS and contain information on the maximum amplitudes occurring at further time delays.

Using the maximum value comparison stage MWVS, a common maximum value GMW formed from the maximum values MW1 to MW4 is calculated. The common maximum value contains information on the maximum value occurring in the sum signal SS of which each corresponding partial signal BS1, BS2, BS3 or BS4 is part. The common maximum value GMW is compared with a system-preset clipping value c, and for each main branch HZ1 to HZ4 this comparison is used as a basis for forming the corresponding information signals IS1 to IS4, each of which is forwarded to the corresponding main branch for the purpose of regulating the amplitude limitation.

The following applies (where 1×4):

$$ISX = \begin{cases} c & \text{for } GMW < c \\ GMW & \text{else} \end{cases}$$

with c as the predefined clipping value.

A common clipping value, which is c in this example, is used for all partial signals BS1 to BS4. Otherwise a specific clipping value cx is used for each partial signal, that is, a clipping value of c1 for the partial signal BS1, a clipping value of c2 for the partial signal BS2, etc.

In the present example assume c=c1=c2=c3=c4.

This example shows the main branch HZ1 in which on the one hand the first information signal IS1 is connected to the module BBC for the purpose of amplitude limitation and on the other hand the first partial signal BS1 is connected with a delay via a delay element del.

Amplitude limitation is regulated with the aid of a multiplier MUL to which the information signal IS1 is fed as predefined clipping value c1 or as maximum value GMW for multiplication with the first partial signal BS1. An output signal produced by the multiplier MUL is forwarded for further processing.

Figure 4:
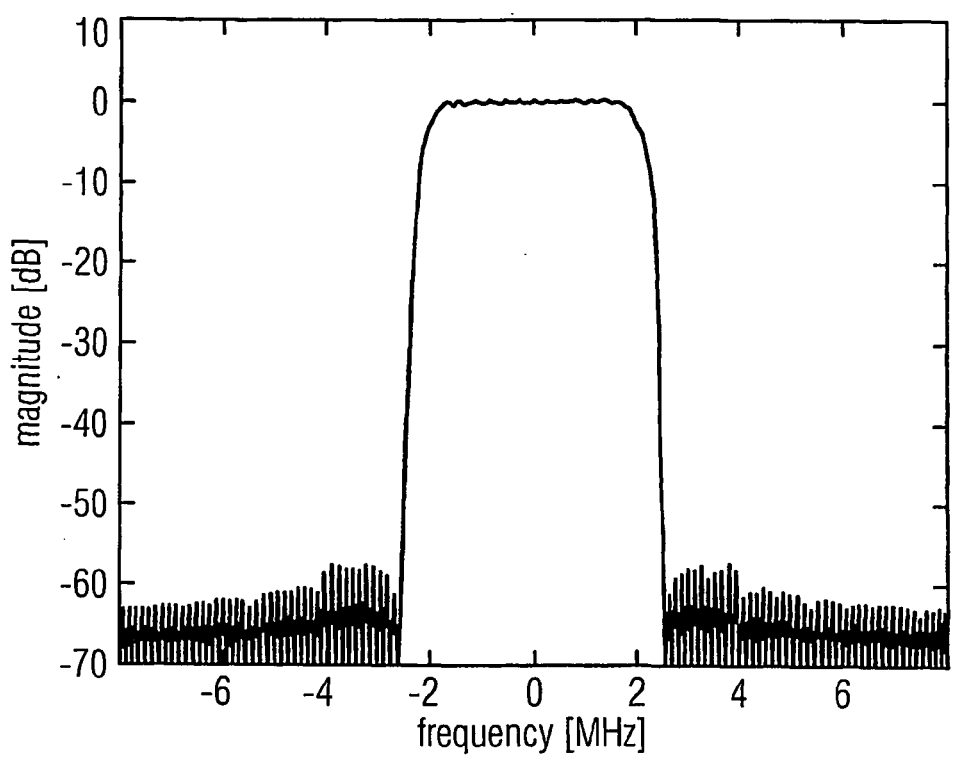
FIG. 4 is graph of a frequency response of a RRC filter.

FIG. 4 shows a frequency response of a RRC filter (cosine roll-off filter).

In this a frequency drift from a center frequency is expressed in MHz on the X axis, and associated attenuation values are expressed in dB on the Y axis.

FIGS. 5 to 9 show signal sequences from partial filters as shown in FIG. 3.

Figure 5:
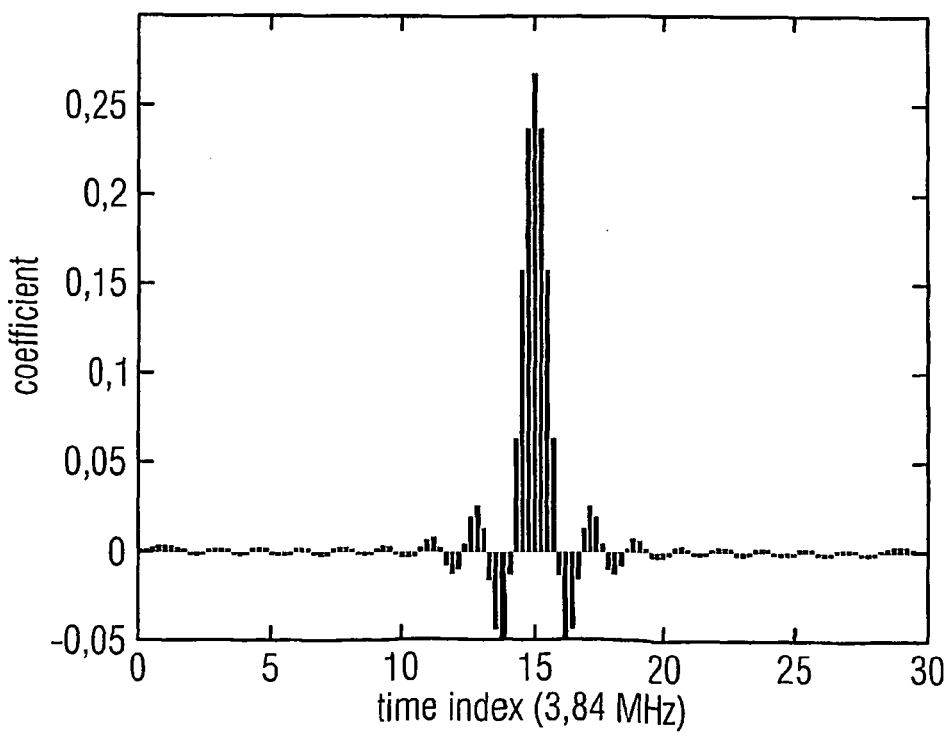
FIGS. 5 to 9 are graphs of coefficients versus time for signal sequences from partial filters as shown in FIG. 3.
Figure 6:
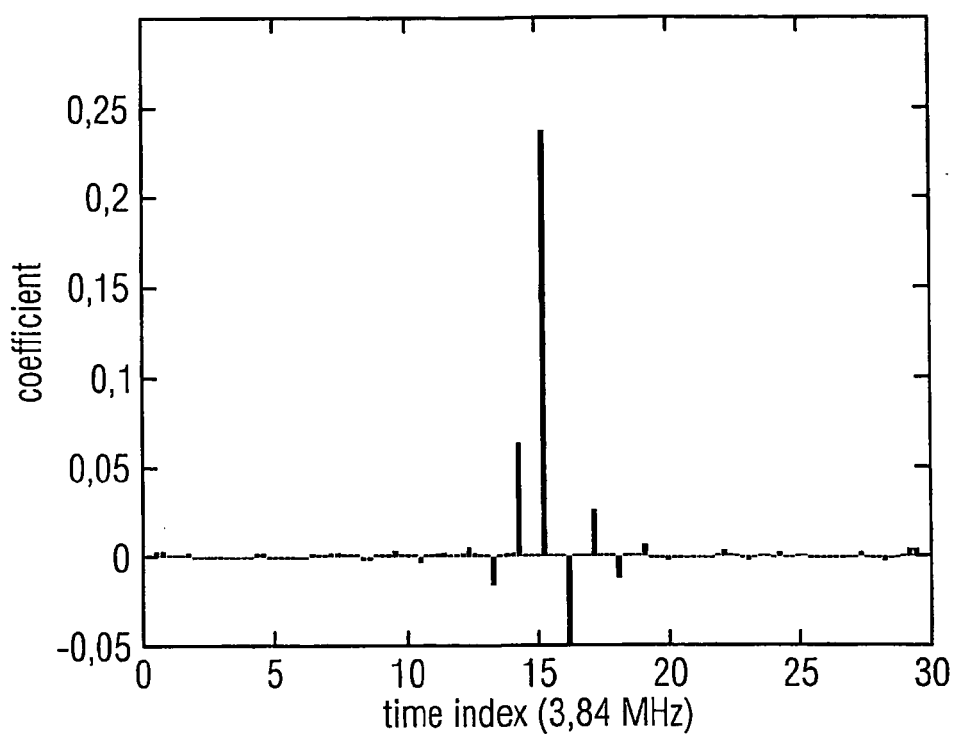
Figure 7:
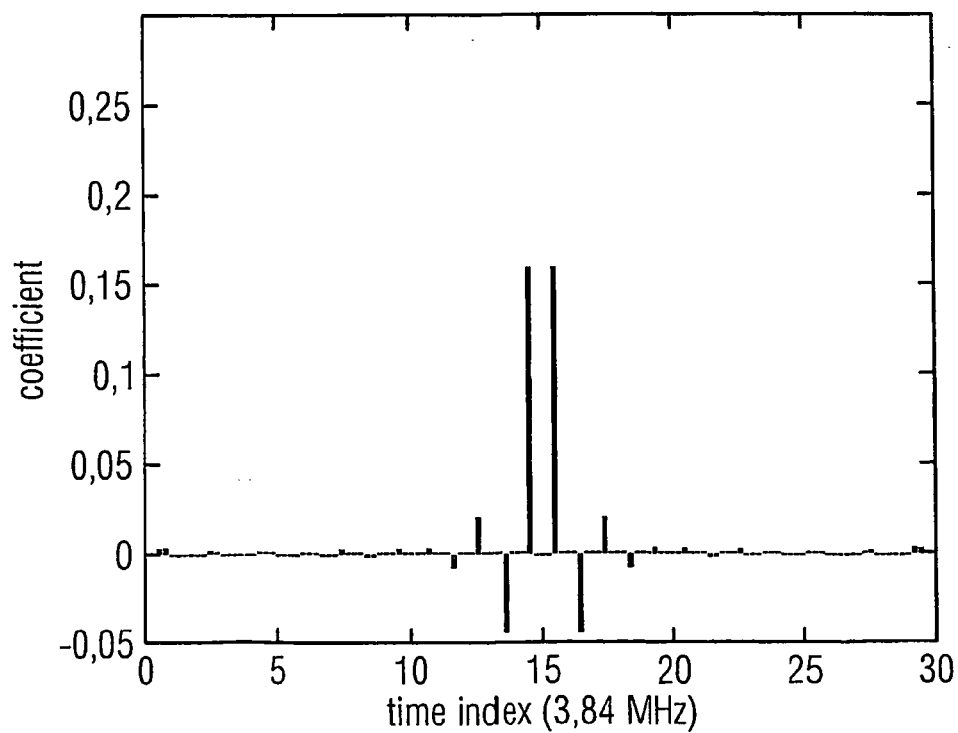
Figure 8:
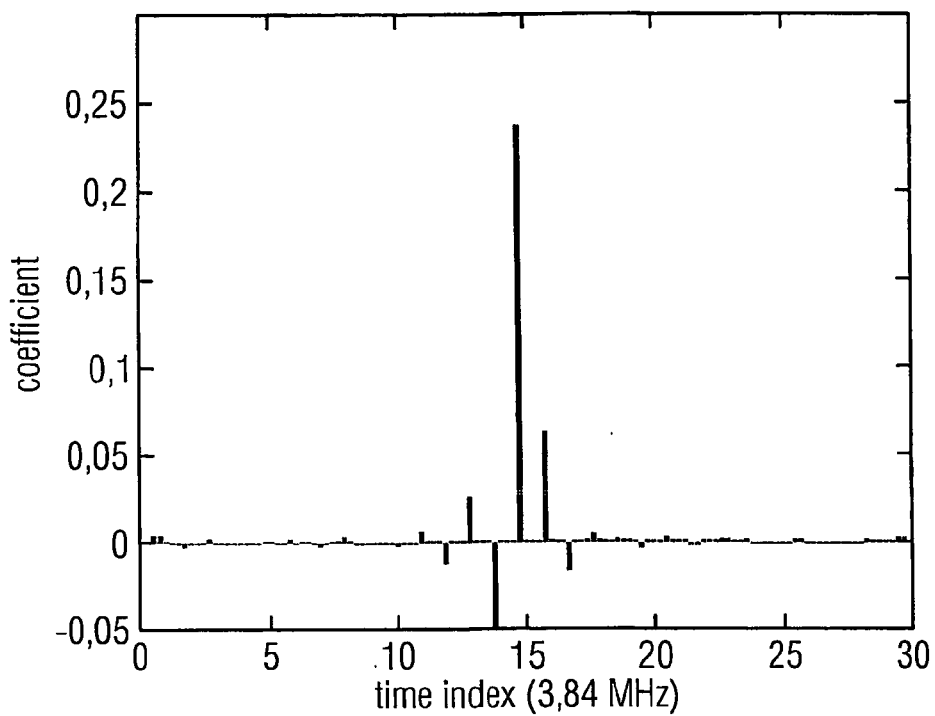
Figure 9:
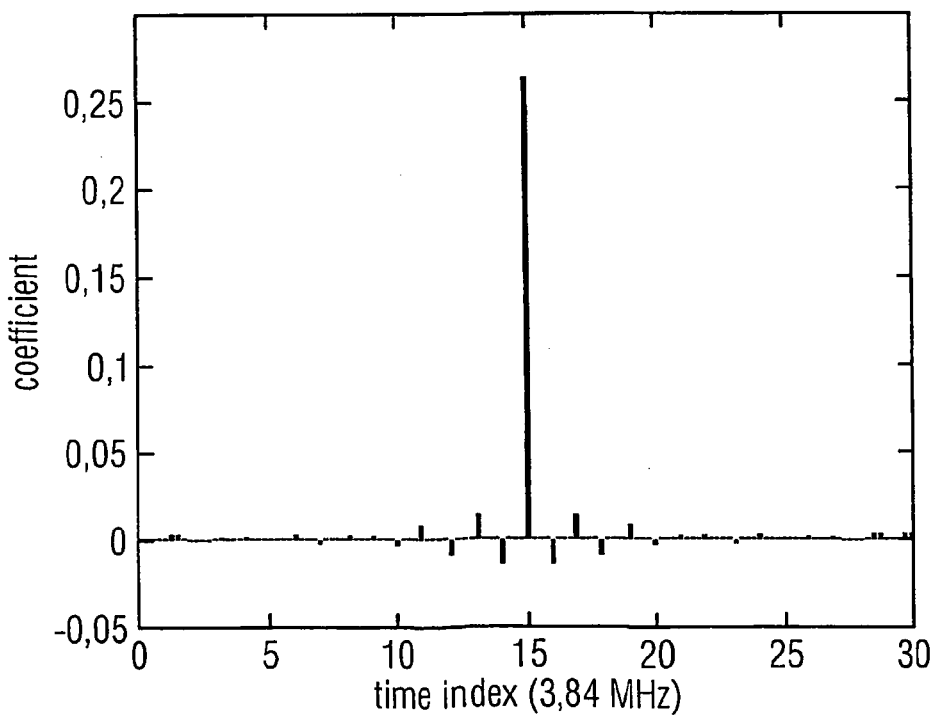

FIG. 5 shows a signal sequence for the frequency response shown in FIG. 4 for an interpolation by a factor of n=4. The X axis plots a time t divided up in a time index of $T=\frac{1}{3.84}$ MHz, and the Y axis plots associated coefficients as data values of the signal sequence.

At an interpolation by a factor of 4, three "0" values are inserted between each item of useful data, leading to a periodic repetition of the corresponding useful signal spectrum in the frequency range. Due to the insertion of "0" values, in the event of direct formation of a convolution sum, multiplication by a "0" result occurs, and therefore does not need to be explicitly executed. Closer examination shows that this provides four partial filters, each one operating in the same sampling pulse as each of the partial signals BS1 to BS4 respectively and together constituting a RRC filter.

Comparably to FIG. 5, the Y axes in FIGS. 6, 7, 8 and 9 show coefficients as data values of signal sequences from the four partial filters.

FIG. 10 shows a further simplified block diagram for forming a carrier frequency UMTS transmitter signal TS from a single partial signal BS1 according to the invention.

A treatment of a single-carrier arrangement is shown. Here too, a partial signal BS1 reaches on the one hand the main branch HZ1 and on the other hand the auxiliary branch NZ1 as an input signal.

Within the main branch HZ1 the partial signal BS1 is limited in amplitude (BBC), filtered (RRC) and interpolated (IP). Comparably to FIG. 2, in the auxiliary branch NZ1 a expected peak values in the main branch is estimated with the aid of a module APRRC1 and an information signal IS1 is formed. The latter is fed to the main branch HZ1 for the purpose of regulating the amplitude limitation.

The single-carrier arrangement shown here is also a multi-carrier arrangement if the partial signal BS1 results from a plurality of signals S11, S12, S13, etc. to S1$k$ (not shown) due to modulation and combination, and the RRC filter corresponding to the frequencies used during the modulation passes the corresponding useful signal bands without attenuation and attenuates all further partial signal bands.

Figure 11:
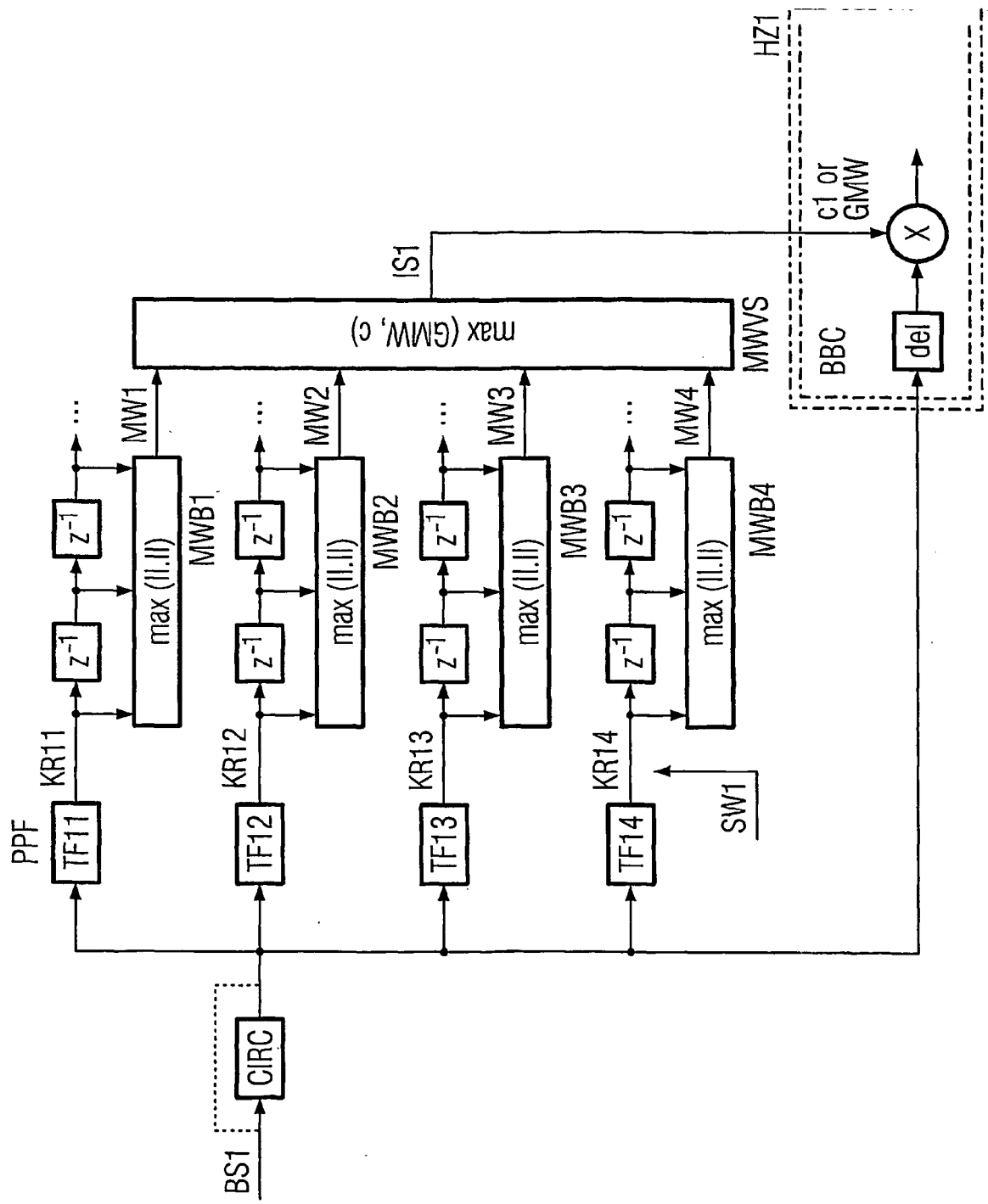
FIG. 11 is a simplified block diagram for a first typical embodiment for forming an information signal as displayed in FIG. 10.

FIG. 11 shows a first typical embodiment for forming the information signal IS1 displayed in FIG. 10.

First of all a circular clipping method shown here as the device CIRC is used on the partial signal BS1 in the basic frequency band. Although the circular clipping method is optional here, it is particularly advantageous since increased heights in the partial signal BS1 are suppressed in the normal sampling time index.

Next it is forwarded to a polyphase filter PPF formed of four partial filters TF11, TF12, TF13 or TF14 for forming signal sequences KR11 to KR14. These are fed, comparably to FIG. 3, on the one hand directly and on the other hand delayed with the aid of a plurality of delay elements $z^{-1}$, to maximum value forming devices MWB1 to MWB4, the maximum values MW1 to MW4 of which are then fed to a maximum value comparison stage MWVS. Following the method described above an information signal IS1 is again formed and fed to the main branch HZ1 for the purpose of regulating the amplitude limitation.

FIG. 12 shows a second typical embodiment for forming the information signal IS1 displayed in FIG. 10.

In this variant, which is optimized with respect to implementation effort, the first partial signal BS1 undergoes a circular clipping method (CIRC) and is then fed via an interpolation device IP to a maximum value device MW. The interpolation device IP is designed as a half-band filter with an interpolation factor of 2 and thus represents only a coarse approximation to the RRC filter frequency response.

On choosing this option the first partial filter TF11 from FIG. 11 becomes a simple time delay, and the signal sequence KR11 does not exceed a predefined clipping threshold c due to the preceding circular clipping method. Thus the clipping threshold c can only be exceeded by the signal sequence KR12 of the second partial filter TF12—shown in this example as interpolation device IP. In this case the partial signal BS1 must be reduced further in the device BBC. This reduction may be brought about by for instance forming a reciprocal of the signal sequence KR12 in the maximum value device MW and multiplying this with the clipping threshold c.

This produces a scaling factor IS1 with which the partial signal BS1 must be scaled so as to standardize it to the value of the clipping threshold c by amount.

As already described, in this case too the value of the partial signal BS1 is included in a plurality of values of the signal sequence KR12. The minimum that has now been formed is used to define a minimum scaling factor IS1 in such a way that a maximum value for the signal sequence KR12 is also standardized to the greatest possible extent to the value of the clipping threshold c by amount.

In order to avoid an increase in signal amplitudes in the partial signal BS1, the scaling factor IS1 is limited to a value of "1" by amount.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for forming a carrier frequency output signal from n partial signals of a basic frequency band, comprising:
    attributing each of the n partial signals as an input signal to a corresponding main branch and a corresponding auxiliary branch;
    determining, in each corresponding auxiliary branch, an i-th estimated value in an i th auxiliary branch for $1 \leq i \leq n$ for an expected peak value of the input signal in the corresponding main branch, said determining including
        filtering an i-th partial signal attributed to the i-th auxiliary branch, a plurality of times corresponding to n;
        forming a signal sequence based on maximum values resulting from all of said filtering of the i-th partial signal; and
        determining the estimated value for the i-th auxiliary branch based on the signal sequence;
    forming a corresponding information signal for each estimated value in the corresponding auxiliary branch;
    limiting amplitude of the input signal in each corresponding main branch based on the corresponding information signal to keep the carrier frequency output signal limited in amplitude and free from distortion;
    filtering and converting the input signal in each corresponding main branch into an intermediate frequency partial signal;
    assembling n intermediate frequency partial signals into a sum signal; and
    performing digital-to-analog conversion of the sum signal to produce the carrier frequency output signal.

2. A method according to claim 1, wherein said filtering in each corresponding main branch includes sending the input signal through a root raised cosine filter.

3. A method according to claim 1, further comprising, in each corresponding auxiliary branch
    adding the signal sequence of the i-th partial signal to form an i-th amount sum; and
    forming an i-th maximum value based on the i-th amount sum.

4. A method according to claim 3, further comprising:
    forming a common maximum value from m maximum values;
    comparing the common maximum value with a predefined clipping value; and
    forming each corresponding information signal based on said comparing.

5. A method according to claim 4, further comprising in each corresponding main branch multilplying the corresponding information signal by a delayed partial signal.

6. A method according to claim 1, further comprising:
    creating the i-th partial signal by modulation and combination of individual signals;
    using a root raised cosine filter to only slightly attenuate useful signal bands corresponding to modulation frequencies, while attenuating further partial signal bands.

* * * * *